(12) United States Patent
Uchiyama et al.

(10) Patent No.: US 7,165,425 B2
(45) Date of Patent: Jan. 23, 2007

(54) MULTI-TUBE BURNER AND GLASS PREFORM MANUFACTURING METHOD USING THE SAME

(75) Inventors: Keisuke Uchiyama, Sakura (JP);
Masahiro Horikoshi, Sakura (JP);
Koichi Harada, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/610,922

(22) Filed: Jul. 2, 2003

(65) Prior Publication Data

US 2004/0065120 A1    Apr. 8, 2004

(30) Foreign Application Priority Data

Jul. 5, 2002    (JP) ............................. 2002-197896

(51) Int. Cl.
*C03B 37/018* (2006.01)

(52) U.S. Cl. ........................... 65/531; 65/414; 65/413; 65/17.4; 65/355; 431/127; 431/129; 431/153; 431/177

(58) Field of Classification Search ................. 65/414, 65/413, 531, 17.4, 355; 431/127, 129, 153, 431/177, 195, 354, 349, 351
See application file for complete search history.

(56) References Cited

U.S. PATENT DOCUMENTS

| 4,618,354 A | * | 10/1986 | Suda et al. | ................ | 65/416 |
| 6,332,340 B1 | | 12/2001 | Bodelin et al. | | |
| 6,725,690 B2 | * | 4/2004 | Enomoto et al. | ............. | 65/414 |

FOREIGN PATENT DOCUMENTS

| JP | 11-199264 A | 7/1999 |
| JP | 2000-327341 A | 11/2000 |

* cited by examiner

*Primary Examiner*—Mark Halpern
(74) *Attorney, Agent, or Firm*—Sughrue Mion, PLLC

(57) ABSTRACT

A multi-tube burner is provided which includes a cylindrical outermost nozzle and at least one cylindrical inner nozzle provided coaxially with the outermost nozzle to form annular jet openings for gases used to manufacture a glass preform. The angle between a center axis of an outer circumference of the outermost nozzle and a distal end portion of each of the inner nozzles is 90°± not more than 3°. Furthermore, the distance between the center axis of the outer circumference of the outermost nozzle and each of center axes of inner circumferences and outer circumferences of the inner nozzles is not more than 0.20 mm.

15 Claims, 5 Drawing Sheets

MULTI-TUBE BURNER AND GLASS PREFORM MANUFACTURING METHOD USING THE SAME

CROSS-REFERENCE TO RELATED APPLICATIONS

This application is based upon and claims the benefit of priority from Japanese Patent Application No. 2002-197896, filed on Jul. 5, 2002, in the Japanese Patent Office.

BACKGROUND OF THE INVENTION

1. Field of the Invention

The present invention relates to a multi-tube burner and to a manufacturing method that uses this burner.

2. Description of the Related Art

A vapor phase axial deposition (VAD) method and an outside vapor phase deposition (OVD) method are known as methods for manufacturing glass preforms, in particular, the base material of optical fibers. In these methods, a glass feedstock gas is jetted from a burner together with adjunct gas, flammable gas, combustion aiding gas, and the like, and fine particles of glass (soot) are synthesized by causing the glass feedstock gas to undergo a hydrolysis reaction in a flame. The fine glass particles are accumulated in outer peripheral portions and bottom end portions of a starting member, thereby enabling a porous glass preform to be obtained. This porous glass preform is then sintered in an electric furnace so that it changes into transparent glass which forms the base material for an optical fiber.

Burners used in the above process include a multi-tube burner in which a plurality of gas jet nozzles for the various gases used in the synthesis of the fine glass particles are provided in a concentric configuration, and a multiple nozzle burner in which a plurality of combustion aiding gas jet nozzles are provided between a plurality of flammable gas jet nozzles that are arranged in a concentric configuration. These burners are generally formed from quartz glass in order to avoid contamination from impurities.

However, if a large number of glass preforms are manufactured continuously using a conventional burner, as time passes, contamination of the distal end portion of the burner caused by adhesion thereto of fine glass particles and the like occurs, as does wear of the distal end portion of the burner. If problems in the distal end of the burner such as these arise, the fine glass particle accumulation efficiency is lowered, and glass preforms of a consistent quality cannot be obtained. For example, as the number of manufactured glass preforms rises, the problem arises that the outer diameter of glass preforms obtained under the same manufacturing conditions becomes gradually smaller.

The fine glass particle accumulation efficiency is defined as being the ratio of the total number of fine glass particles accumulated in the starting member relative to the total number of fine glass particles if it is assumed that all of the glass feedstock gas used is changed into fine glass particles by chemical reaction.

If the outer diameter of the glass preforms becomes gradually smaller, then, using the VAD method, it is not possible to obtain the target wavelength dispersion values or the target draw diameter. Moreover, using the OVD method, the target wavelength dispersion values and mode field diameter and the like could not be obtained In addition, if the outer diameter of a porous glass preform becomes gradually smaller, the bulk density thereof changes and there have been breakages in some porous glass preforms. If this type of phenomenon arises, the yield of optical fiber base material ultimately obtained is reduced.

The present invention provides a multi-tube burner that suppresses changes in the outer diameter of a glass preform during the manufacturing of that glass preform and enables a glass preform of consistent quality to be manufactured consecutively, and also to a glass preform manufacturing method that uses this multi-tube burner.

SUMMARY OF THE INVENTION

A multi-tube burner of the present invention includes a cylindrical outermost nozzle and at least one cylindrical inner nozzle which is provided coaxially within the outermost nozzle to form annular jet openings for gases used to manufacture a glass preform. The angle between a center axis of an outer circumference of the outermost nozzle and the distal end portion of each of the inner nozzles is 90°± not more than 3°.

In this multi-tube burner, a distance between a center axis of an outer circumference of an outermost nozzle of the multi-tube burner and center axes of inner circumferences and outer circumferences of nozzles on an inner side of the outermost nozzle is preferably not more than 0.20 mm.

A multi-tube burner of the second aspect of the present invention includes a cylindrical outermost nozzle and at least one cylindrical inner nozzle which is provided coaxially within the outermost nozzle to form annular jet openings for gases used to manufacture a glass preform, and a distance between a center axis of an outer circumference of the outermost nozzle and each of center axes of inner circumferences and outer circumferences of the inner nozzles is not more than 0.20 mm.

According to the multi-tube burners of the present invention, it is possible to suppress changes in the outer diameter of a glass preform during the manufacturing of the glass preform, thereby enabling a large number of glass preforms of consistent quality to be manufactured consecutively Accordingly, a glass preform manufactured using this multi-tube burner is of excellent quality, resulting in an increase in the glass preform yield.

A glass preform manufacturing method of the present invention includes producing fine glass particles using one of the above-mentioned multi-tube burners; accumulating the fine glass particles in outer peripheral portions and bottom end portions of a starting member, and subjecting the accumulated fine glass particles to heating process so that a glass preform is obtained.

BRIEF DESCRIPTION OF THE DRAWINGS

Aspects of illustrative, non-limiting embodiments of the present invention will become more apparent by describing in detail embodiments thereof with reference to the attached drawings in which:

FIG. 1A is a plan view showing a distal end portion of an embodiment of the multi-tube burner of the present invention, while

DETAILED DESCRIPTION OF THE INVENTION

The following description of the illustrative, non-limiting embodiments discloses specific configurations, components, and operations. However, the embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and operations of the present invention that would have been known to one skilled in the art are omitted for the sake of clarity and brevity.

Figure 1A:
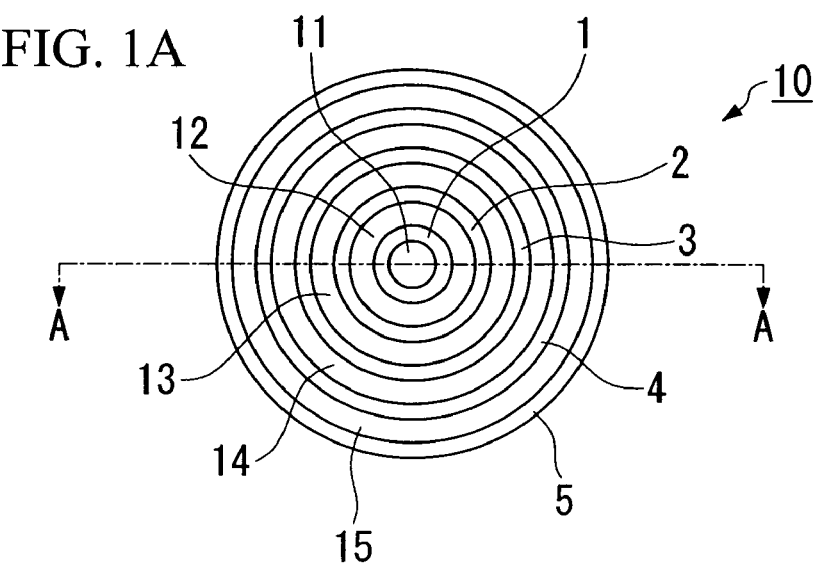
Figure 1B:
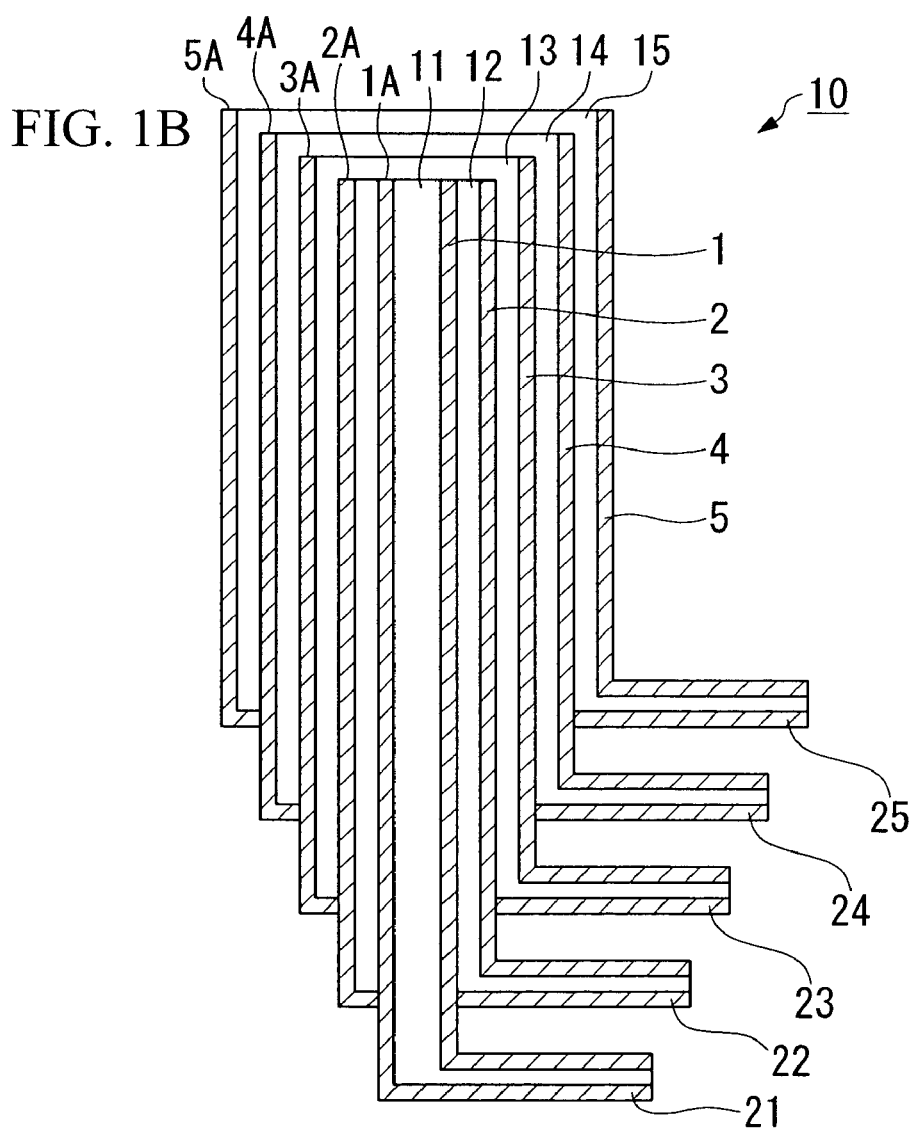
FIG. 1B is a schematic cross-sectional view taken along the line A—A in FIG. 1A.
Figure 2:
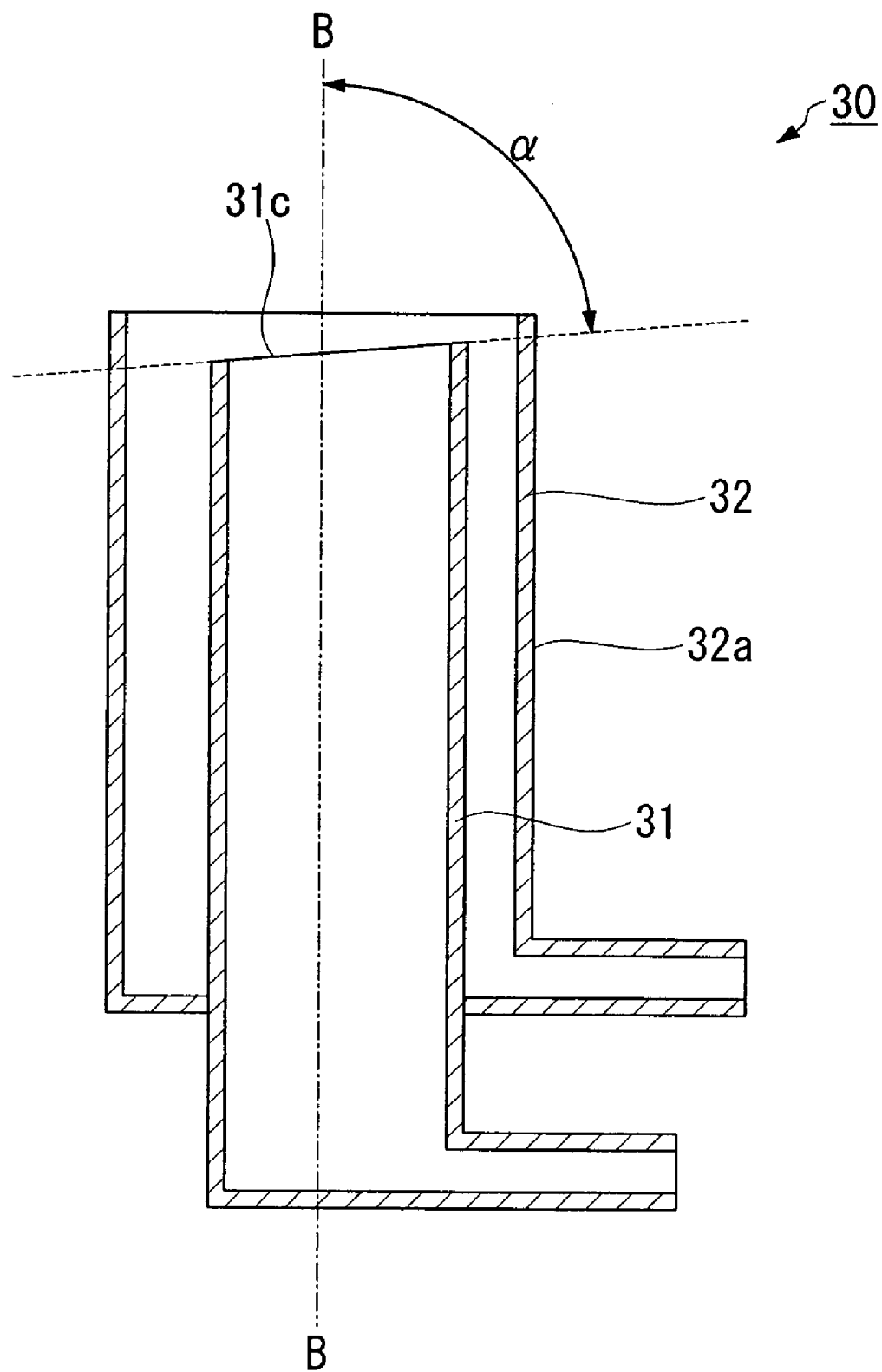
FIG. 2 is a schematic cross-sectional view explaining the first embodiment of the multi-tube burner of the present invention.

FIGS. 1A and 1B show an embodiment of the multi-tube burner of the present invention. FIG. 1A is a plan view showing a distal end portion of the multi-tube burner, while FIG. 1B is a schematic cross-sectional view taken along the line A—A in FIG. 1A.

In this multi-tube burner 10, a cylindrical first nozzle 1 is provided substantially in the center of the distal end portion thereof. A cylindrical second nozzle 2 is provided coaxially around the circumference of the first nozzle 1. Additionally, in the same manner, there are provided a cylindrical third nozzle 3, a cylindrical fourth nozzle 4, and a cylindrical outermost fifth nozzle 5. These nozzles 1 to 5 may be formed from quartz glass in order to avoid contamination from impurities.

A first jet opening 11 is formed at the distal end of the first nozzle 1. An annular aperture between the first nozzle 1 and the second nozzle 2 forms a second jet opening 12. An annular aperture between the second nozzle 2 and the third nozzle 3 forms a third jet opening 13. An annular aperture between the third nozzle 3 and the fourth nozzle 4 forms a fourth jet opening 14. Lastly, an annular aperture between the fourth nozzle 4 and the fifth nozzle 5 forms a fifth jet opening 15.

In this embodiment, the distal end portion 2A of the second nozzle 2 is positioned at the same height as the distal end portion 1A of the first nozzle 1. The distal end portion 3A of the third nozzle 3 is positioned at a level higher than the distal end portion 2A of the second nozzle 2. The distal end portion 4A of the fourth nozzle 4 is positioned at a level higher than the distal end portion 3A of the third nozzle 3. The distal end portion 5A of the fifth nozzle 5 is positioned at a level higher than the distal end portion 4A of the fourth nozzle 4. The thickness of the wall of each of the distal end portions 1A to 5A is uniform. However, the present invention is not limited to this structure.

A first gas supply pipe 21 is connected to a base end portion of the first nozzle 1. A second gas supply pipe 22 is connected to a base end portion of the second nozzle 2. A third gas supply pipe 23 is connected to a base end portion of the third nozzle 3. A fourth gas supply pipe 24 is connected to a base end portion of the fourth nozzle 4. Lastly, a fifth gas supply pipe 25 is connected to a base end portion of the fifth nozzle 5. In this embodiment, each of the gas supply pipes 21 to 25 has a cylindrical shape and is attached perpendicularly to the outer peripheral surface of the base end portion of the nozzles 1 to 5, respectively. The gas supply pipes 21 to 25 can be connected to a gas supply apparatus (not shown) and various gases can be supplied from the gas supply apparatus through the gas supply pipes 21 to 25 so that each of the gases is respectively discharged from each of the first to fifth jet openings 11 to 15.

In this embodiment, the angle between a center axis in a longitudinal direction of an outer circumference of the outermost nozzle 5 and each of the distal end portion 1A to 4A of the nozzles 1 to 4 other than the outermost nozzle 5 is set to 90°± not more than 3°, namely, 87° to 93°. The center axis of the outer circumference of the outermost nozzle 5 and the distal end portion 5A of the outermost nozzle 5 is also preferably set to 90°± not more than 3°, namely, 87° to 93°.

In order to simplify the explanation, as shown in PIG. 2, a burner having two nozzles is used as an example. This multi-tube burner 30 is formed by an inner nozzle 31 (this can be any one of the inner nozzles 1 to 4) and an outermost nozzle 32 (this can be the outermost nozzle 5). An angle α between a center axis B of the outer circumference 32a of the outermost nozzle 32 and a distal end portion 31c of the inner nozzle 31 is in the range of 90°± not more than 3°, namely, in the range of 87° to 93°.

If the angle α is within this range, because a part of each of the distal end portions 1A to 4A does not protrude into the flame generated by the burner 10, it is possible to reduce the partial wear of the distal end portions 1A to 4A and to suppress the partial adhesion of fine glass particles on the distal end portions 1A to 4A. Therefore, during the manufacturing of a glass preform using this multi-tube burner, a change in the outer diameter of the glass preform can be suppressed and a large number of glass preforms of consistent quality can be manufactured consecutively.

Furthermore, in the embodiment shown in FIG. 1, the distance between the center axis of the outer circumference of the outermost nozzle 5 and each of the center axes of the inner circumferences and the outer circumferences of the nozzles 1 to 4 is not more than 0.20 mm.

Figure 3A:
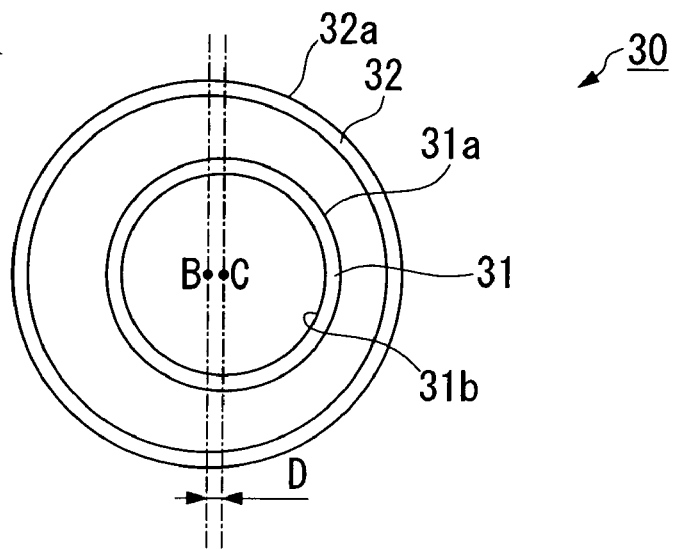
FIGS. 3A and 3B are a plan view and a cross-sectional view explaining a feature of the multi-tube burner.
Figure 3B:
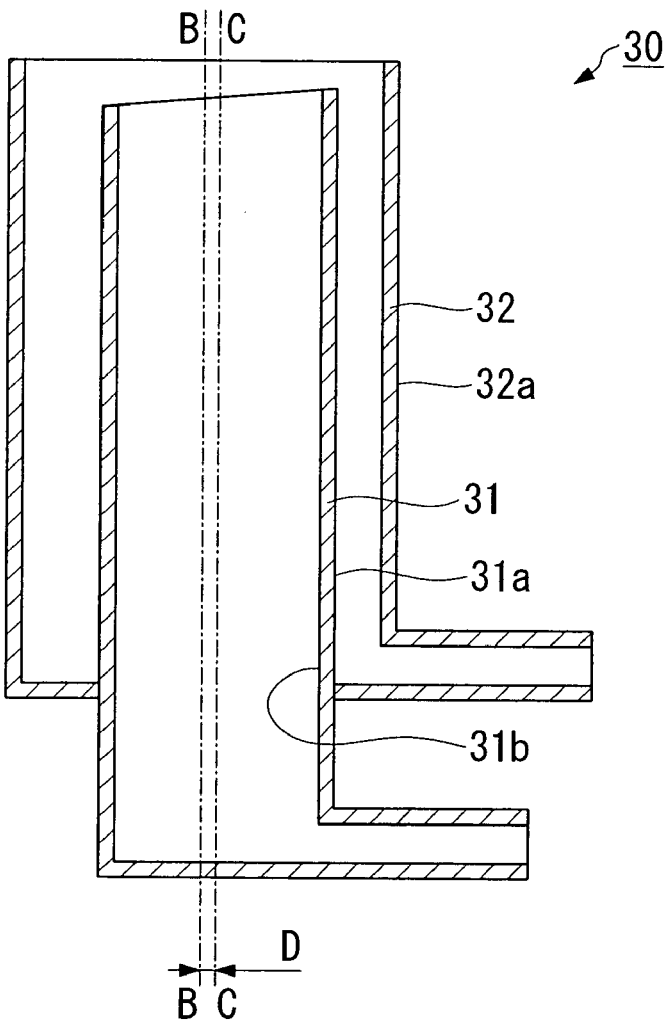

In order to simplify the explanation, as shown in FIGS. 3A and 3B, a burner 30 having two nozzles 31 and 32 is used as an example. The multi-tube burner 30 is formed by an inner nozzle 31 (this can be any one of the nozzles 1 to 4) and an outermost nozzle 32 (this can be the outermost nozzle 5). A distance D between a center axis B of the outer circumference 32a of the outermost nozzle 32 and a center axis C of the outer circumference 31a and the inner circumference 31b of the inner nozzle 31 is not more than 0.20 mm.

If the above distances D is within this range, because a part of each of the distal end portions 1A to 4A does not come close to the flame generated by the burner 10, it is possible to reduce the partial wear of the distal end portions 1A to 4A and to suppress the partial adhesion of fine glass particles on the distal end portions 1A to 4A. Therefore, during the manufacturing of a glass preform using this multi-tube burner 10, a change in the outer diameter of the glass preform can be suppressed and a large number of glass preforms of consistent quality can be manufactured consecutively.

The glass preform manufacturing method of the present invention will now be described using FIGS. 1A, 1B, and 4. In this glass preform manufacturing method, firstly, $SiCl_4$.

for example, as a glass feedstock gas is supplied to the gas supply pipe 21 and is discharged from the first jet opening 11 of the multi-tube burner 10. In addition, argon gas as an inert gas is supplied to the gas supply pipe 22 and is discharged from the second jet opening 12, hydrogen gas as a flammable gas is supplied to the gas supply pipe 23 and is discharged from the third jet opening 13, argon gas as an inert gas is supplied to the gas supply pipe 24 and is discharged from the fourth jet opening 14, and oxygen gas as a combustion aiding gas is supplied to the gas supply pipe 25 and is discharged from the fifth jet opening 15. These discharged gases are mixed and burn, and the flame 106 is brown to the outer peripheral portions and bottom end portions of a starting member 101 (or a porous glass preform produced on the starting member 101). The starting member 101 is coaxially suspended by a pulling up shaft 100 and can be rotated around its axis 105 by a rotating mechanism (not shown). A chamber 104 is provided to accommodate the starting member 101 and the flame 106.

Fine glass particles are then synthesized as a result of a hydrolysis reaction in the flame 106 of the burner 10, and these fine glass particles are accumulated in outer peripheral portions and bottom end portions of the starting member 101, thereby enabling a porous glass preform to be obtained. The bottom face of the porous glass preform is inspected by an image pickup device 103 along a horizontal line 102 in order to measure the growth speed of the porous glass preform. The pulling-up speed of the pulling-up shaft 100 is feedback controlled based on the signal output from the image pickup device 103.

The porous glass preform then undergoes high temperature processing immediately after being accumulated or immediately after the manufacturing of the porous glass preform so that a glass preform is obtained.

According to the above glass preform manufacturing method, because fine glass particles are accumulated in outer peripheral portions and bottom end portions of a starting member 101 using the multi-tube burner 10, changes in the outer diameter of the glass preforms are suppressed, and a large number of glass preforms of consistent quality can be manufactured consecutively under the same manufacturing conditions. Accordingly, glass preforms obtained using the above glass preform manufacturing method exhibit the target characteristic values and have a consistent quality. As a result, the glass preform yield is improved. In addition, during the manufacturing of a porous glass preform before it is vitrified, there is no occurrence of the drawback of the porous glass preform breaking.

This effect was discovered by the present inventors, and the need of the above dimensional precision has not been recognized in this technical field. Because multi-tube burners are normally made by hand using quartz, dimensional precision of nozzles of the burners is limited. Therefore, conventional multi-tube burners can not satisfy the conditions of the present invention.

The present invention is not limited to the above embodiments, and various modifications can be applied to the above embodiments in the scope of claims of the present application. For example, the number of inner nozzles may be 1, 2, 3, 5, or more. In addition, the kinds of gases applied to the nozzles can be changed as occasion demands. For example, mixed gas of at least two of a glass feedstock gas such as $SiCl_4$, an inert gas such as Ar, a flammable gas such as $H_2$, and a combustion aiding gas such as $O_2$, may be applied to at least one of the nozzles.

EXAMPLES

Specific examples using FIG. 1 are given below to make the effects of the present invention clear. It is to be understood that the present invention is not limited by the examples given below.

Example 1

Figure 4:
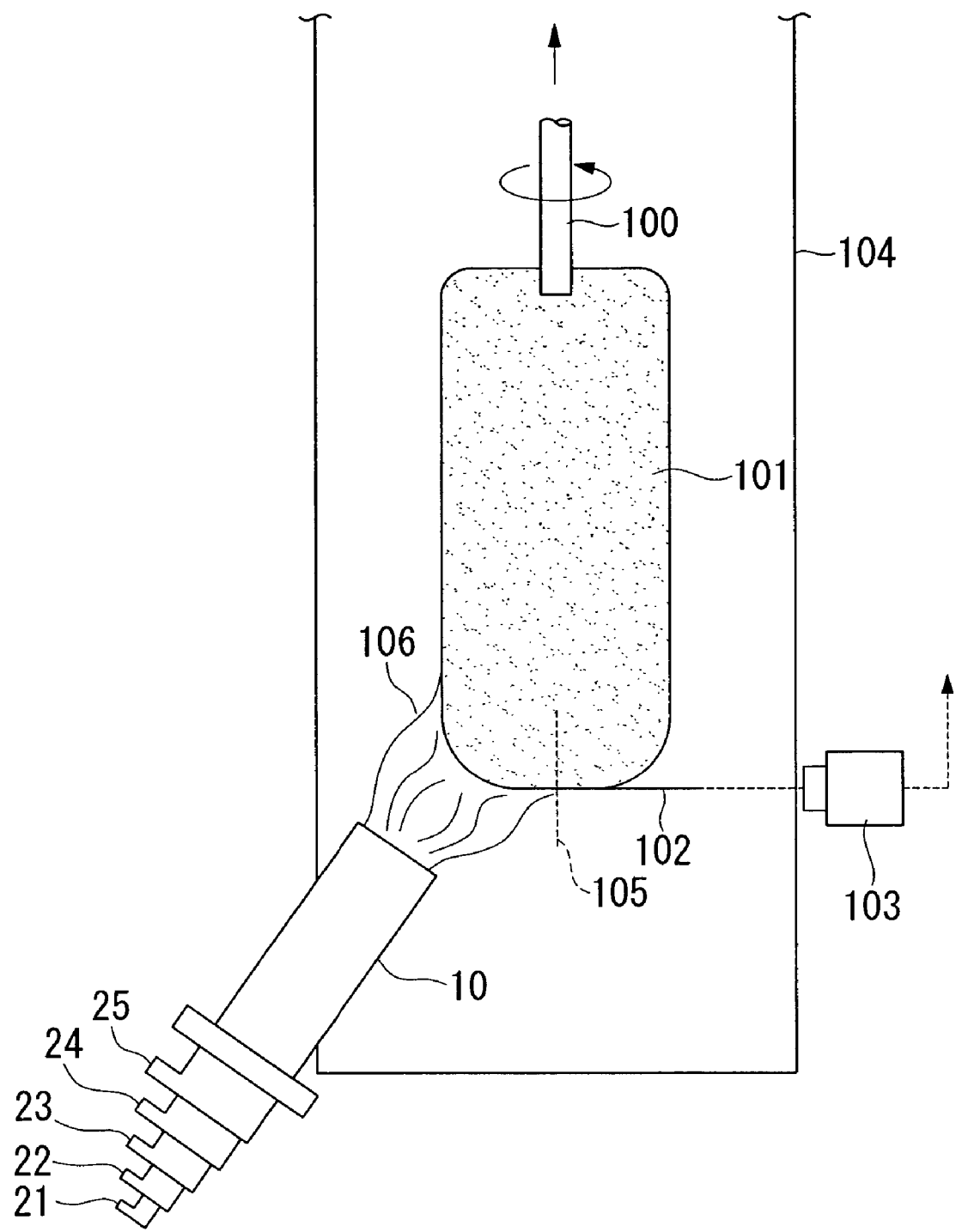
FIG. 4 is a cross sectional view showing an apparatus used in a manufacturing method of an embodiment of the present invention.

A cylindrical starting member was suspended vertically and rotated around its axis as shown in FIG. 4. $SiO_2$ fine glass particles were caused to grow and accumulate in bottom end portions of the starting member from the multi-tube burner 10 shown in FIG. 1, so as to manufacture porous glass preforms. These were then vitrified at high temperature until 100 glass preforms were manufactured consecutively. At this time, each of the gases used in the manufacture of the porous glass preforms was supplied to the respective gas supply nozzles from the respective gas feedstocks (not shown). $SiCl_4$ as a glass feedstock gas was supplied at a flow rate of 6.0 (SLM) to the first supply pipe 21. Argon gas as an inert gas was supplied at a flow rate of 1.0 (SLM) to the second supply pipe 22. Hydrogen gas as a flammable gas was supplied at a flow rate of 9.0 (SLM) to the third supply pipe 23. Argon gas as an inert gas was supplied at a flow rate of 5.0 (SLM) to the fourth supply pipe 24. Lastly, oxygen gas as a combustion aiding gas was supplied at a flow rate of 35.0 (SLM) to the fifth supply pipe 25.

In the multi-tube burner 10 shown in FIG. 1, the inner diameter of the first nozzle 1 was set at 7.0 mm and the outer diameter of the first nozzle 1 was set at 9.0 mm. The inner diameter of the second nozzle 2 was set at 16.0 mm and the outer diameter of the second nozzle 2 was set at 18.0 mm. The inner diameter of the third nozzle 3 was set at 22.0 mm and the outer diameter of the third nozzle 3 was set at 24.0 mm. The inner diameter of the fourth nozzle 4 was set at 28.0 mm and the outer diameter of the fourth nozzle 4 was set at 30.0 mm. The inner diameter of the fifth nozzle 5 was set at 34.0 aim and the outer diameter of the fifth nozzle 5 was set at 36.0 mm.

In addition, a maximum value for the angle between the center axis in the longitudinal direction of the outer circumference of the outermost fifth nozzle S and the distal end portion of the third nozzle 3 was set at 90°±2.8°. The angles between the center axis of the outermost fifth nozzle 5 and the distal end portions of the other inner nozzles 1, 2, and 4 was set substantially at 90°, and the distances between the center axis of the outer circumference of the outermost nozzle 5 and the center axes of the inner circumferences and the outer circumferences of the nozzles 1 to 4 is substantially 0 mm.

Example 2

In the multi-tube burner shown in FIG. 1, apart from setting the distance between the center axis of the outer circumference of the outermost fifth nozzle 5 and the center axis of the outer circumference of the second nozzle 2 at 0.18 mm, 100 glass preforms were manufactured consecutively under the same conditions as were used in Example 1. The maximum value for the angle between the center axis in the longitudinal direction of the outer circumference of the outermost fifth nozzle 5 and the distal end portion of the third nozzle 3 was set substantially at 90°.

Comparative Example 1

In the multi-tube burner shown in FIG. 1, apart from setting a maximum value for the angle between the center axis in the longitudinal direction of the outer circumference of the outermost fifth nozzle 5 and the distal end portion of the third nozzle 3 at 90°±3.3°, 100 glass preforms were manufactured consecutively under the same conditions as were used in Example 1.

Comparative Example 2

In the multi-tube burner shown in FIG. 1, apart from setting the distance between the center axis of the outer circumference of the outermost fifth nozzle 5 and the center axis of the outer circumference of the second nozzle 2 at 0.31 mm, 100 glass preforms were manufactured consecutively under the same conditions as were used in Example 1. The maximum value for the angle between the center axis in the longitudinal direction of the outer circumference of the outermost fifth nozzle 5 and the distal end portion of the third nozzle 3 was set substantially at 90°.

Figure 5:
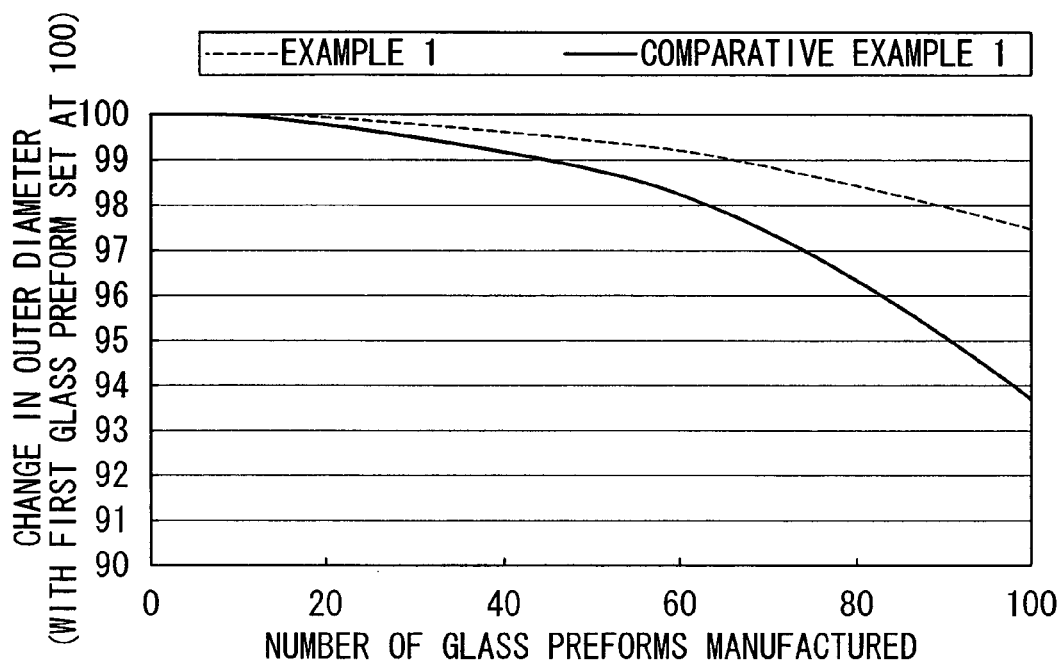
FIG. 5 is a graph showing a change in the outer diameter of the glass preforms when 100 glass preforms were manufactured consecutively using the multi-tube burner of Example 1 and the multi-tube burner of Comparative Example 1.

FIG. 5 is a graph showing a change in the outer diameter of the glass preforms when 100 glass preforms were manufactured consecutively using the multi-tube burner of Example 1 and the multi-tube burner of Comparative Example 1.

From the results shown in FIG. 5, it was confirmed that when 100 glass preforms were manufactured using the multi-tube burner of Example 1, the outer diameter of the one hundredth glass preform was not less than 97% of the outer diameter of the first glass preform. In contrast, it was confirmed that when 100 glass preforms were manufactured using the multi-tube burner of Comparative Example 1, the outer diameter of the one hundredth glass preform was not more than 94% of the outer diameter of the first glass preform. Moreover, during the manufacturing of the glass preforms of Comparative Example 1, from the $80^{th}$ glass preform on, there were several cases of the porous glass preform breaking, while there were no cases of this happening during the manufacturing of the glass preforms of Example 1.

Figure 6:
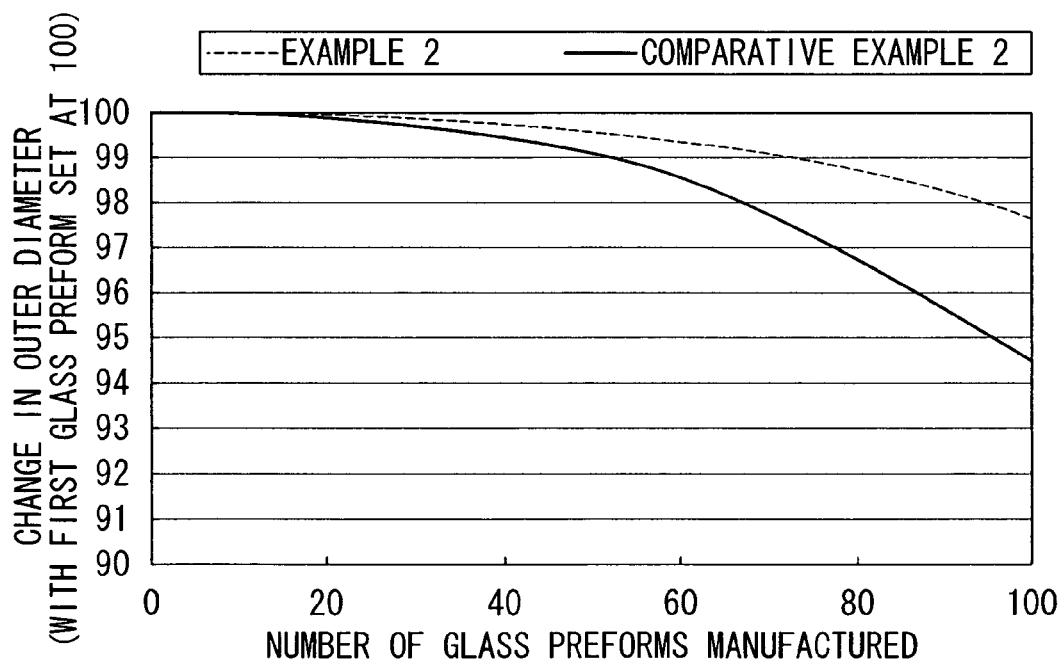
FIG. 6 is a graph showing a change in the outer diameter of the glass preforms when 100 glass preforms were manufactured consecutively using the multi-tube burner of Example 2 and the multi-tube burner of Comparative Example 2.

FIG. 6 is a graph showing a change in the outer diameter of the glass preforms when 100 glass preforms were manufactured consecutively using the multi-tube burner of Example 2 and the multi-tube burner of Comparative Example 2.

From the results shown in FIG. 6, it was confirmed that when 100 glass preforms were manufactured using the multi-tube burner of Example 2, the outer diameter of the one hundredth glass preform was not less than 97% of the outer diameter of the first glass preform. In contrast, it was confirmed that when 100 glass preforms were manufactured using the multi-tube burner of Comparative Example 2, the outer diameter of the one hundredth glass preform was not more than 95% of the outer diameter of the first glass preform. Moreover, during the manufacturing of the glass preforms of Comparative Example 2, from the $90^{th}$ glass preform on, there were several cases of the porous glass preform breaking, while there were no cases of this happening during the manufacturing of the glass preforms of Example 2.

The previous description of illustrative embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents thereof.

What is claimed is:

1. A multi-tube burner comprising:
   a cylindrical outermost nozzle; and
   at least one cylindrical inner nozzle provided coaxially with the cylindrical outermost nozzle so as to form annular jet openings for gases used to manufacture a glass preform,
   wherein the at least one cylindrical inner nozzle comprises a first cylindrical inner nozzle, a second cylindrical inner nozzle which surrounds the first cylindrical inner nozzle, and two or more other cylindrical inner nozzles which surround the second cylindrical inner nozzle,
   a distal end portion of the first cylindrical inner nozzle is positioned at the same height as a distal end portion of the second cylindrical inner nozzle,
   at least a glass feed stock gas is discharged from a first jet opening formed at the distal end portion of the first nozzle, and at least an inert gas is discharged from a second jet opening formed between the first nozzle and the second nozzle,
   a difference in height between the distal end portion of the second cylindrical inner nozzle and a distal end portion of the other cylindrical inner nozzle externally adjacent to the second cylindrical inner nozzle is the same as a difference in height between distal end portions of any two adjacent nozzles selected from the group consisting of the other cylindrical inner nozzles and the cylindrical outermost nozzle, wherein said differences in height are not zero,
   the heights from the distal end portion of the first cylindrical inner nozzle to the cylindrical outermost nozzle increases, and
   angles formed between a center axis of an outer circumference of the cylindrical outermost nozzle and distal end portions of all the cylindrical inner nozzles are 90°± not more than 3°.

2. A multi-tube burner according to claim 1, wherein radial distances between the center axis of the outer circumference of the cylindrical outermost nozzle and center axes of inner circumferences and outer circumferences of all the cylindrical inner nozzles are not more than 0.20 mm.

3. A multi-tube burner according to claim 1, wherein the other cylindrical inner nozzles comprise a third cylindrical inner nozzle which surrounds the second cylindrical inner nozzle, wherein a distal end portion of the third cylindrical inner nozzle is positioned at a level higher than the distal end portion of the second cylindrical inner nozzle.

4. A multi-tube burner according to claim 3, wherein the other cylindrical inner nozzles comprise a fourth cylindrical inner nozzle which surrounds the third cylindrical inner nozzle, wherein a distal end portion of the fourth cylindrical inner nozzle is positioned at a level higher than the distal end portion of the third cylindrical inner nozzle.

5. A multi-tube burner according to claim 4, wherein a distal end portion of the cylindrical outermost nozzle is positioned at a level higher than the distal end portion of the fourth cylindrical inner nozzle.

6. A multi-tube burner according to claim 1, wherein a distal end portion of the cylindrical outermost nozzle is positioned at a level higher than the distal end portion of the at least one cylindrical inner nozzle.

7. A multi-tube burner according to claim 1, wherein the angles formed between a center axis of an outer circumference of the cylindrical outermost nozzle and distal end portions of all the cylindrical inner nozzles are not 90° angles.

8. A multi-tube burner according to claim 1, wherein each of the cylindrical outermost nozzle and the at least one cylindrical inner nozzle comprises a gas supply pipe extending in a direction away from a respective center axis thereof.

9. A multi-tube burner comprising:
a cylindrical outermost nozzle; and
at least one cylindrical inner nozzle provided coaxially with the cylindrical outermost nozzle so as to form annular jet openings for gases used to manufacture a glass preform,
wherein the at least one cylindrical inner nozzle comprises a first cylindrical inner nozzle, a second cylindrical inner nozzle which surrounds the first cylindrical inner nozzle, and two or more other cylindrical inner nozzles which surround the second cylindrical inner nozzle,
a distal end portion of the first cylindrical inner nozzle is positioned at the same height as a distal end portion of the second cylindrical inner nozzle,
at least a glass feed stock gas is discharged from a first jet opening formed at the distal end portion of the first nozzle, and at least an inert gas is discharged from a second jet opening formed between the first nozzle and the second nozzle,
a difference in height between the distal end portion of the second cylindrical inner nozzle and a distal end portion of the other cylindrical inner nozzle externally adjacent to the second cylindrical inner nozzle is the same as a difference in height between distal end portions of any two adjacent nozzles selected from the group consisting of the other cylindrical inner nozzles and the cylindrical outermost nozzle, wherein said differences in height are not zero,
the heights from the distal end portion of the first cylindrical inner nozzle to the cylindrical outermost nozzle increases, and
radial distances between a center axis of an outer circumference of the cylindrical outermost nozzle and center axes of inner circumferences and outer circumferences of all the cylindrical inner nozzles are not more than 0.20 mm.

10. A multi-tube burner according to claim 9, wherein the other cylindrical inner nozzles comprise a third cylindrical inner nozzle which surrounds the second cylindrical inner nozzle, wherein a distal end portion of the third cylindrical inner nozzle is positioned at a level higher than the distal end portion of the second cylindrical inner nozzle.

11. A multi-tube burner according to claim 10, wherein the other cylindrical inner nozzles comprise a fourth cylindrical inner nozzle which surrounds the third cylindrical inner nozzle, wherein a distal end portion of the fourth cylindrical inner nozzle is positioned at a level higher than the distal end portion of the third cylindrical inner nozzle.

12. A multi-tube burner according to claim 11, wherein a distal end portion of the cylindrical outermost nozzle is positioned at a level higher than the distal end portion of the fourth cylindrical inner nozzle.

13. A multi-tube burner according to claim 9, wherein a distal end portion of the cylindrical outermost nozzle is positioned at a level higher than a distal end portion of the at least one cylindrical inner nozzle.

14. A multi-tube burner according to claim 9, wherein the radial distances between a center axis of an outer circumference of the cylindrical outermost nozzle and center axes of inner circumference and outer circumference of all the cylindrical inner nozzles are more than 0 mm and not more than 0.20 mm.

15. A multi-tube burner according to claim 9, wherein each of the cylindrical outermost nozzle and the at least one cylindrical inner nozzle comprises a gas supply pipe extending in a direction away from a respective center axis thereof.

* * * * *